Jan. 5, 1943.　　　　　　G. S. MOORE　　　　　　2,307,151
SPEED INDICATING SIGNAL APPARATUS
Filed Jan. 20, 1940　　　　3 Sheets-Sheet 2
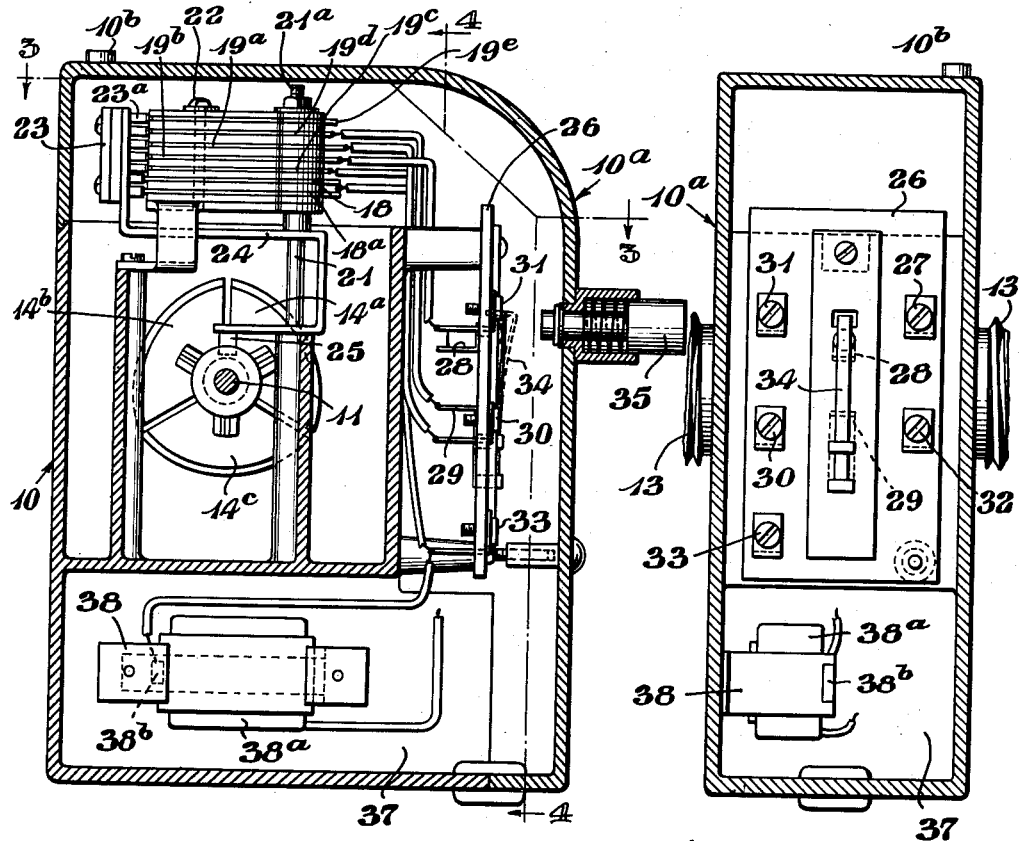
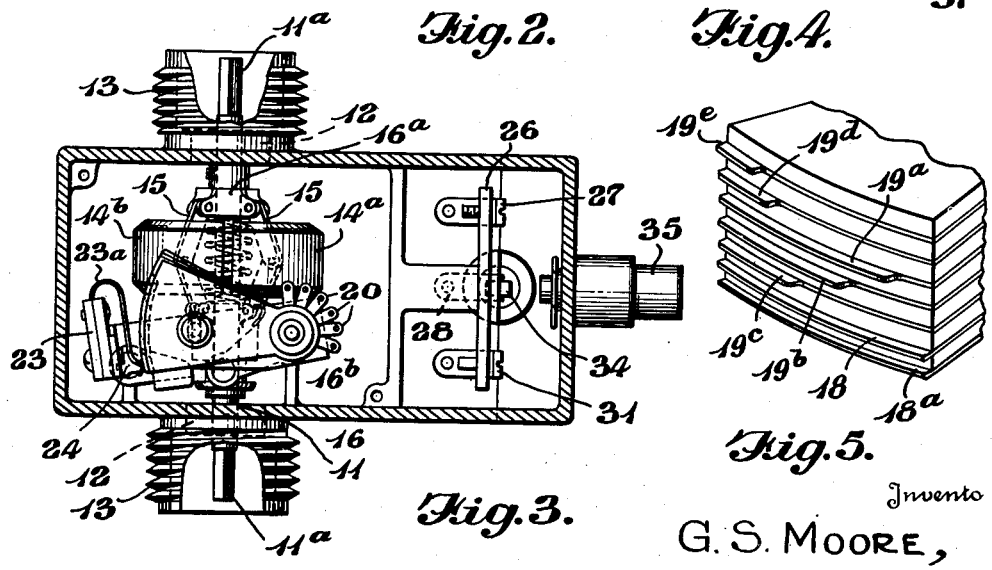
Inventor
G. S. MOORE,
Attorney

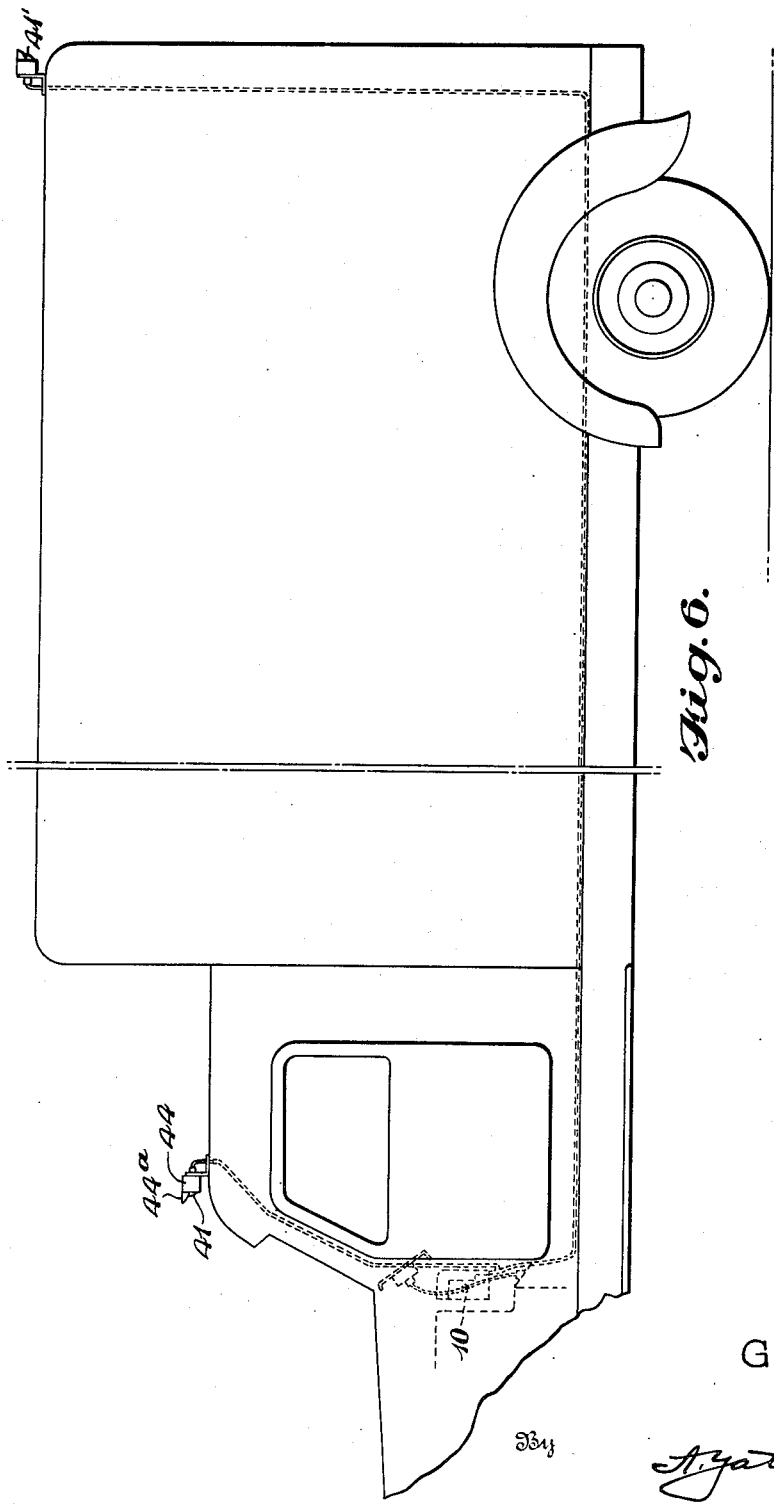

Patented Jan. 5, 1943

2,307,151

UNITED STATES PATENT OFFICE 2,307,151

SPEED INDICATING SIGNAL APPARATUS

Giles S. Moore, Indianapolis, Ind.

Application January 20, 1940, Serial No. 314,872

1 Claim. (Cl. 177—311.5)

This invention relates to speed indicating means for motor or self-propelled vehicles, such as automobiles, trucks and like, of that type which serve to apprise not only the driver but any other interested party within sight of the vehicle when the latter exceeds a predetermined speed.

This application is a continuation in part of my copending application Ser. No. 142,700 filed May 14, 1937.

Signals of this general type have long been proposed, but as far as known, have heretofore never been developed to such practical form as to render them acceptable not only by the public but by law enforcement officials, Interstate Commerce Commission, insurance companies and other parties concerned. To meet the rigid requirements of present day traffic laws and ordinances and at the same time merit the confidence of all and have a definite appeal to owners and operators of vehicles, signal apparatus must operate with absolute surety and certainty, the signals must be readily discernible day and night both close-up and from relatively great distances, and they must not be confusingly similar with respect to other signals required by law; the entire apparatus must be of simple construction and easily installed and capable of giving long and dependable service; it must be immune from nefarious tampering; and it must be compact and occupy little space and be pleasing in design and appearance.

The primary object of the present invention, therefore, is to provide speed-indicating signal apparatus which will fulfill the foregoing requirements.

Another object is to generally improve signal apparatus of the type specified.

The foregoing and other objects and advantages will become apparent in view of the following description taken in conjunction with the drawings, wherein:

Fig. 2 is a view in sectional elevation of the governor-controlled switch unit forming part of the apparatus;

Figure 1:
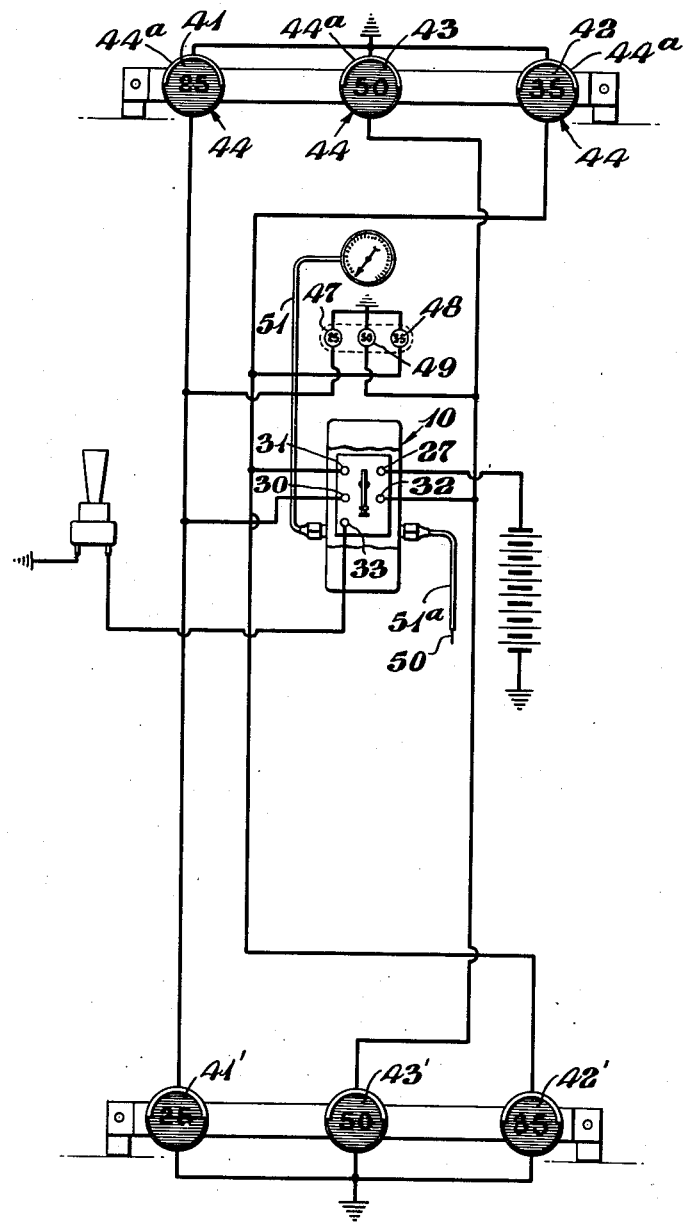
Fig. 1 is a diagrammatic lay-out of signal apparatus embodying features of the present invention.

Figs. 3 and 4 are sectional views taken on the lines 3—3 and 4—4, respectively, Fig. 2.

Fig. 5 is a detail perspective view particularly showing the construction and arrangement of the contact edges of the switch plates;

Fig. 6 is a view in side elevation of a heavy duty motor vehicle or truck having the improved signal apparatus operatively installed thereon; and Fig. 7 shows the panel board of the vehicle of Fig. 6.

The speed-indicating apparatus, in general, comprises signal lights constructed and arranged in a particular manner to promote easy reading and visibility by an observer from all angles both close-up and from points distant and which are herein illustrated in units or banks of three each, located both front and rear, an interior pilot bank for driver's information, an audible signal operating through the horn, and a governor-controlled switch unit constructed in a manner such as to most effectively carry out the system of speed indication.

Referring to the drawings in detail, the "heart" of the system is the switch unit, the housing of which is generally indicated at 10, Figs. 1 to 4, inclusive. This unit follows generally the construction of the switch described and claimed in Patent No. 2,128,841, granted Aug. 30, 1938, but has been changed and incorporates certain additional features to better adapt it to the present improved system. The housing 10 is provided with a cover 10a which is removably secured to the housing by screws 10b, said cover when removed exposing the entire switch unit. A governor shaft 11 is mounted in bearings 12 installed in opposed walls of the housing 10, said shaft terminating at opposite ends in squared driving portions 11a which project into exteriorly threaded coupling bosses 13.

Mounted on the shaft 11 is a synchronizing governor comprising a plurality of weights 14a, 14b and 14c, each of which is pivotally connected to jointed links 15, the latter at their outer ends being connected to sleeve 16 and collar 16a, respectively. Sleeve 16 is provided with an annular groove 16b and is mounted for sliding movement on shaft 11, while collar 16a is fixed to and rotates with said shaft, and between said sleeve and collar is a governor spring 17.

As shaft 11 revolves, the governor weights are caused to swing outwardly due to centrifugal force, the sliding sleeve 16 moving inwardly against the resistance of spring 17, reduction in speed of rotation of the shaft 11 permitting the spring to reverse the movement of the sleeve.

The switch proper comprises a plurality of contact segments or plates with dielectric or insulating material therebetween, there being 7 plates in the example shown and designated 18, 18a and 19a, 19b, 19c, 19d, 19e. Plates 18 and 18a are what may be termed "hot" plates, since they are connected to the battery or other source of current and serve to transmit current to the remaining plates through a brush to be described, while the plates 19a—19e are signal plates or contacts since they transmit current from the "hot" plates to the signal lights and horn relay. At their rear ends, the switch plates are provided with terminals or eyes 20.

The entire bank of contact segments is securely fixed on a post 21 by means of nut 21a, said post being in turn fixed or anchored to a portion of the housing 10. It is important that the segments be conveniently adjustable and remain in accurate position after adjustment. Accordingly, a clamping screw bolt 22 is passed through the block of segments and insulating material, the segments being formed with clearance slots for said bolt.

An arcuately movable brush 23 is provided and has a series of spring fingers 23a, one for each plate but joined to a common base or conductor, so that current is transmitted from the "hot" plates to the signal plates through the brush. The brush is secured on the one extremity of a lever 24, the latter being pivoted or journaled on the post 21 and at its opposite extremity carrying a pin 25 engaging in the groove 16b of sleeve 16. This ensures positive movement of the brush whenever the governor actuates sleeve 16.

The "hot" plates or segments 18 and 18a have their arcuate contact edges extending over the full arcuate periphery of the bank of contacts, while the respective signal plates 19a—19e have their contact edges graduated or stepped arcuately, note Fig. 5, to thereby obtain successively stepped speed indications or responses. By adjusting the signal plates with respect to one another and to the "hot" plates, definite speed responses may be obtained.

It will be noted that each signal plate has its edge so contoured as to maintain contact with its coacting brush once contact is established, resulting in the particular signal controlled thereby remaining energized until the brush finger clears the arcuately stepped edge on the return movement of the brush.

It will also be noted that there are a plurality of "hot" plates in the group. This construction ensures good contact throughout the life of the switch and also throughout the full range of movement of the brush fingers.

To simplify installation and render the entire unit compact, the housing 10 has mounted on a wall thereof a terminal block 26, the respective switch plates 18, 18a and 19a—19e being connected to a plurality of terminals on said block and indicated at 27 to 33, inclusive. The terminals 28 and 29 are normally bridged by a protective "make and break" member in the form of a strip of spring metal 34 which when the circuit becomes overloaded is released and springs back and may be returned to bridging position by means of a spring pressed push button 35 mounted in the cover 10a. If desired this protective circuit breaker may be replaced by a fuse.

In the base of the housing 10 is a compartment 37, and housed in this compartment is a relay 38, which is an audible signal relay and is here electrically connected to the relay which energizes the horn. This relay may be of any conventional design and is provided with a coil 38a and a contact 38b.

From the foregoing, it will be noted that the entire switch unit including the terminal panelboard or block 26 and audible signal relay 38 is contained in one housing with all parts accessible simply by removing the cover 10a. In actual practice, the cover 10a as well as the push button 35 are sealed, so that the switch cannot be tampered with by unauthorized parties without breaking the seal or seals.

Referring now to Fig. 1, the speed indicating lights are arranged in units of 3 each and secured on a bracket 40, the lights or lamps being indicated at 41, 42 and 43, and placed a substantial distance apart as shown in Fig. 1. Each lamp is mounted in a reflecting casing 44 provided with an outwardly projecting hood 44a. There are preferably two sets of exterior lamps, one at the front and one at the back of the vehicle, note Fig. 1, the lamp unit at the back of the vehicle being given corresponding reference numerals except that a prime has been added.

The lamps are each provided with a lens of a color which will not render the signal lamps confusingly similar with respect to the conventional signal lights now required by law, such as the rear signal light. In actual practice, the lens is blue with the lens of each lamp of the same color.

In order to render the lamps clearly visible, both close up and from a distance, they are so arranged in conjunction with the switch unit that they will remain illuminated once the respective switch plate controlling its coacting lamp makes contact until the vehicle drops below the speed indicated by the lamp. Thus, for example, when the vehicle exceeds 25 miles, the lamp 41 will become illuminated; when the vehicle reaches 35 miles, the lamp 42 will become illuminated, and when the vehicle reaches 50 miles, the lamp 43 will become illuminated; and if the vehicle continues travelling beyond a speed of 50 miles, all three lamps will remain illuminated. Thus, an observer will know from a distance whether or not the vehicle is travelling beyond a predetermined speed by the number of lamps illuminated and their location. In this manner, a variety of different colored lamps is avoided without in any manner decreasing the ability of an observer to tell the speed of travel of the vehicle at a glance. This feature is also of value in daylight operation where it is sometimes difficult to distinguish between different colored lamps. It also permits a color blind observer to distinguish the speed of travel of the vehicle.

To permit the driver of the vehicle to observe the speed of travel of the same, a pilot light bank is mounted on the panelboard 45, note Figs. 1 and 6, said bank being carried by a bracket 46 and including lights 47, 48 and 49. These pilot lights preferably correspond in color and arrangement to the lights 41, 42 and 43.

The wiring diagram of Fig. 1 is substantially self-explanatory. The governor shaft of the switch unit as therein illustrated is connected into the speedometer drive shaft 50 and which is housed by the conventional cable 51. The switch housing 10 may be provided with a mounting bracket to facilitate attachment to a convenient part of the chassis such as the dash under the hood, and the speedometer drive cable disconnected and connected to the coupling boss 13 at one side of the switch housing 10 with the drive shaft coupled with the squared end 11a of the governor shaft 11. The other end of the governor shaft connects with a continuation of the speedometer cable 51a leading to the transmission, not shown.

The wiring operation may then be proceeded with, the lead from terminal 27 going to the hot line of the vehicle, or direct to the battery, depending upon the most convenient point of connection. Terminals 30, 31 and 32 may then be connected in respective order to the lamps 41, 42 and 43, 41', 42', and 43', and pilot lights 47, 48 and 49.

While the audible signal is not necessary, yet it becomes desirable to indicate speed beyond a safe or legitimate speed. The horn relay of the unit is connected to the vehicle horn relay and should the vehicle go beyond a predetermined speed, the horn will blow continuously as long as such speed is maintained.

The improved signal apparatus has demonstrated its efficiency in actual practice and has met the approval of law enforcement officials, insurance companies and other bodies directly interested in traffic control and regulation. An observer in determining the speed of the vehicle need not depend on the color of any particular light illuminated or any numerals or specific speed indications, but determines the speed by the number of lights illuminated and the relative location of the illuminated lights. Thus, if only the light on the left is illuminated, the speed of the vehicle is between 25 and 35 miles an hour; if both the left and right hand lights are illuminated, the speed is between 35 and 50 miles an hour; whereas if all three are illuminated the speed is 50 miles an hour or better. Thus, the speed indicating signals become easier to read the faster the speed of travel of the vehicle. This feature, while simple once its theory of operation becomes known, has been extremely valuable in obtaining the endorsement of law enforcement officials and other parties concerned with traffic regulations. The switch unit is so designed as to materially simplify installation of the system so that it requires no skilled mechanic to install the apparatus complete. Furthermore, parts which have a tendency to become loose and rattle are eliminated.

It will be understood that certain changes in construction and design may be adopted without departing from the spirit or scope of the invention as defined by the appended claim.

What is claimed is:

In a signal system for indicating speeds of motor vehicles, a bank of signal lamps, means supporting said lamps in substantial alignment and a substantial distance apart, there being at least three lamps in the bank having lens of substantially uniform shade or color different from that of the head or tail lights of the vehicle with the central lamp indicating maximum speed and the lamps on opposite sides of the central lamp respectively indicating different reduced speeds including a low speed, and a medium speed, a governor-controlled switch having a plurality of stationary contacts, one for each lamp and a movable contact adapted to engage such stationary contacts, the latter contacts being provided with contact surfaces arranged to maintain the illumination of said lamps in successive stepped speed relation, to illuminate all the lamps when maximum speed is attained and to maintain the illumination of both the low and medium speed lamps when medium speed is attained.

GILES S. MOORE.